(12) United States Patent  
Tanimoto et al.

(10) Patent No.: US 7,789,281 B2  
(45) Date of Patent: Sep. 7, 2010

(54) ELECTRICALLY DRIVEN FLYWHEEL-FASTENER DRIVER

(75) Inventors: Hideyuki Tanimoto, Hitachinaka (JP); Chikai Yoshimizu, Hitachinaka (JP); Hiroyuki Oda, Hitachinaka (JP); Toshihito Sakaba, Hitachinaka (JP); Shinki Ohtsu, Hitachinaka (JP); Takashi Ueda, Hitachinaka (JP); Yoshihiro Nakano, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 228 days.

(21) Appl. No.: 12/088,469

(22) PCT Filed: Sep. 5, 2006

(86) PCT No.: PCT/JP2006/317934

§ 371 (c)(1),  
(2), (4) Date: Mar. 28, 2008

(87) PCT Pub. No.: WO2007/043265

PCT Pub. Date: Apr. 19, 2007

(65) Prior Publication Data

US 2009/0039136 A1 Feb. 12, 2009

(30) Foreign Application Priority Data

Sep. 30, 2005 (JP) ............................. 2005-288199  
Mar. 14, 2006 (JP) ............................. 2006-068976

(51) Int. Cl.  
*B25C 5/15* (2006.01)  
*B25F 5/00* (2006.01)

(52) U.S. Cl. ................. 227/131; 227/120; 227/129; 227/133

(58) Field of Classification Search ............. 227/131, 227/120, 129, 133  
See application file for complete search history.

(56) References Cited

U.S. PATENT DOCUMENTS

| 2,219,877 A | 10/1940 | Starkey |
| 2,633,953 A | 4/1953 | Gorske |
| 3,004,260 A | 10/1961 | Van Den Elzen |
| 3,149,705 A | 9/1964 | Shoquist |

(Continued)

FOREIGN PATENT DOCUMENTS

DE 37 42 163 A1 6/1989

(Continued)

*Primary Examiner*—Brian D Nash  
(74) *Attorney, Agent, or Firm*—Antonelli, Terry, Stout & Kraus, LLP.

(57) ABSTRACT

An electric fastener driver having a compact size and simple construction. A driver segment provided with a rack is movably disposed in a housing. A flywheel is driven by a motor. A drive shaft is concentric with and integral with the flywheel. A coil spring is fixed to the drive shaft. A driven rotor is coaxial with the drive shaft and has one end portion serving as a spring seat portion positioned within the coil spring. A pinion is disposed at the driven rotor and is meshedly engaged with the rack. An urging section is disposed within the driven rotor. A ball is movably disposed in a through-hole formed in the driven rotor for urging an end portion of the coil spring by the urging section. A solenoid controls a protruding amount of the ball from the surface of the driven rotor.

16 Claims, 16 Drawing Sheets

U.S. PATENT DOCUMENTS

| | | | |
|---|---|---|---|
| 3,393,779 A | | 7/1968 | Sacchini |
| 4,326,613 A | | 4/1982 | Houlberg |
| 4,449,660 A | * | 5/1984 | Smith, III ........................ 227/8 |
| 5,029,689 A | | 7/1991 | Grimm |
| 6,669,072 B2 | * | 12/2003 | Burke et al. ................. 227/131 |
| 6,705,503 B1 | * | 3/2004 | Pedicini et al. .............. 227/131 |
| 7,506,788 B2 | * | 3/2009 | Liang et al. ................. 227/133 |
| 2002/0104869 A1 | | 8/2002 | Garvis et al. |
| 2002/0185514 A1 | * | 12/2002 | Adams et al. ................... 227/2 |
| 2003/0192933 A1 | * | 10/2003 | Pedicini et al. .............. 227/131 |
| 2003/0192934 A1 | * | 10/2003 | Pedicini et al. .............. 227/131 |
| 2005/0218185 A1 | * | 10/2005 | Kenney et al. ............... 227/133 |
| 2005/0242154 A1 | * | 11/2005 | Leimbach .................... 227/131 |
| 2009/0032566 A1 | * | 2/2009 | Liang et al. ................. 227/131 |
| 2009/0032567 A1 | * | 2/2009 | Liang et al. ................. 227/131 |

FOREIGN PATENT DOCUMENTS

| | | |
|---|---|---|
| DE | 38 07 308 A1 | 9/1989 |
| JP | 08-197455 | 8/1996 |

\* cited by examiner

ELECTRICALLY DRIVEN FLYWHEEL-FASTENER DRIVER

TECHNICAL FIELD

The present invention relates to a fastener driver, and more particularly, to an electrically powered fastener driver.

BACKGROUND ART

In a conventional fastener driver, a pneumatically operated fastener driver is widely used in which a compressor is provided to generate a compressed air serving as a power source to drive the fastener driver. Since the pneumatically operated fastener driver requires the compressor, the compressor must be carried together with the fastener driver. This is troublesome when fastener driving operation must be performed while moving the faster driver from the first floor to the second floor. Thus, portability may be lowered. Further, a spot is required for installing the compressor. However, a working place is not always flat for installing the compressor. Thus, working place is also limited.

In order to overcome the problem in terms of limitation of working place and portability those attendant to the pneumatically operated fastener driver, an electrically powered fastener driver is provided in which a solenoid coil serving as a main drive source is driven by an electric power. In the fastener driver using the solenoid coil, low electric efficiency of the solenoid results such as about 5 to 20%. Therefore, a bulky driver is required in order to ensure large driving force. For example, an entire weight of the fastener driver incorporating the solenoid coil is three times as large as the weight of the pneumatically operated fastener driver to be used for driving the same kind of fasteners. Therefore, it would be very difficult to hand hold the solenoid-driven driver for a long period of time.

In order to improve electric efficiency of the electrically powered fastener driver using the solenoid, Japanese Patent Application Kokai No. H08-197455 discloses a fastener driver provided with a flywheel driven by an electric power. A rotational kinetic energy accumulated in the flywheel is utilized for driving the fastener driver.

In the electrically powered fastener driver using the flywheel, high electrical efficiency results such as 50 to 70%. Since driving energy for driving the fastener can be increased by increasing rotation number of the flywheel, entire weight of the flywheel type fastener driver can be reduced to about 1.5 times as large as the weight of the pneumatically operated fastener driver to be used for driving the same kind of fastener.

However, in order to perform fastener driving operation with a reduced reaction, kinetic energy accumulated in the flywheel must be transmitted to a fastener driving mechanism within an extremely shortened period such as several ten millimeter-seconds required for the fastener driving operation. In the fastener driver described in the JP reference, a complicated mechanism having the solenoid, a plurality of cams and balls is provided, so that a resultant fastener driver becomes bulky, which violates the advantage of compactness in the flywheel type fastener driver. Further, in accordance with the increase in the number of mechanical components, a possibility of a breakdown will be increased.

DISCLOSURE OF INVENTION

It is therefore an object of the present invention to provide a light-weight and compact electrically powered fastener driver having a simplified construction.

This and other object of the present invention will be attained by an electric fastener driver including a housing, a motor, a magazine, a flywheel, a driven rotor, a driver segment, a coil spring, and a clutch mechanism. The housing has a fastener driving side. The motor is disposed in the housing. The magazine is attached to the housing for supplying a fastener to the fastener driving side. The flywheel is rotatably supported to the housing and is driven by the motor. The driven rotor is rotatably supported to the housing. The driver segment is driven by the driven rotor and is movable toward and away from the fastener driving side. The coil spring transmits a rotation force of the flywheel to the driven rotor. The clutch mechanism selectively couples the flywheel to the driven rotor through the coil spring.

With this arrangement, since the flywheel is coupled to the driven rotor through the coil spring, the driver segment can be driven by the motor. Further, since the coil spring is of a resilient member, the coil spring can properly absorb impact force upon clutch-ON state. As a result, application of excessive impacting load to the motor is avoidable when the coil spring drivingly connects the flywheel to the driven rotor.

Preferably, the clutch mechanism is movable between a power transmission position at which the coil spring is coupled to the driven rotor and a power shut-off position at which the coil spring is separated from the driven rotor. With this arrangement, driving connection between the coil spring and the driven rotor can be properly shut-off. Accordingly, a power transmission shut-off state to the driven rotor can be provided even if the flywheel is rotated by the motor. Thus, rotational energy can be suitably accumulated in the flywheel.

Preferably, the clutch mechanism includes a solenoid that selectively urges the coil spring. With this arrangement, operation of the clutch mechanism can be accurately controlled since the clutch mechanism is driven by the solenoid.

Preferably, the coil spring has one end portion concentrically fixed to the flywheel, and another end portion disposed over the driven rotor having an outer diameter. The other end portion provides an inner diameter greater than the outer diameter of the driven rotor when the clutch mechanism is at the power shut-off position.

With this arrangement, friction can be generated between the coil spring and the driven rotor by urging the other end of the coil spring to the driven rotor while one end of the coil spring is fixed to the flywheel. In this case, since the rotation of the coil spring about its axis is restrained while the flywheel is rotated, a diameter of the coil spring is gradually reduced to couple the coil spring to the driven rotor. Further, since the inner diameter of the coil spring is greater than the outer diameter of the driven rotor in the power transmission shut-off state, i.e., in the non-driving state of the driver segment, rotation of the driven rotor is prevented even by the rotation of the motor. Accordingly, control to the driver segment can be accurately performed. Moreover, any frictional wearing and heat generation due to the friction between the coil spring and the driven rotor is avoidable in the shut-off state.

Preferably, the driven rotor is of a cylindrical shape providing an internal hollow space, and is formed with a through-hole extending in a radial direction thereof at a position in alignment with the another end portion. The clutch mechanism further includes a contact piece movable in the through-hole in the radial direction. Since the contact piece is located within the driven shaft, a compact device can be provided.

Preferably, the other end portion of the coil spring is provided with an annular flange segment. The through-hole has an open end in alignment with the annular flange segment. With this arrangement, the contact piece is out of contact from the coil spring but is in contact with the flange segment. Since resiliently deformable material such as a material of the coil spring is not required for the flange segment, but the flange segment can be made from frictionally resistant material. As a result, the clutch mechanism can provide an improved durability.

Preferably, the solenoid includes a solenoid plunger and an urging section driven by the solenoid plunger for urging the contact piece. At least a part of the solenoid plunger is disposed within the internal hollow space. Since the solenoid plunger is disposed in the driven rotor, a compact device can be provided.

Preferably, the urging section is rotatable with respect to the solenoid plunger, and has a rotation axis coincident with a rotation axis of the flywheel. Since the solenoid and the flywheel can be arranged coaxially, a compact space is only required for installing the solenoid and flywheel, thereby minimizing overall size of the fastener driver.

Preferably, the driver segment has a fastener driving end and an opposite end. The fastener driver further includes a driver segment feed mechanism provided between the driven rotor and the driver segment for converting a rotary motion of the driven rotor into a linear motion of the driver segment in a direction from the opposite end to the fastener driving end The feed mechanism includes a rack provided at the driver segment and a pinion gear provided at the driven rotor and meshingly engaged with the rack. Since the driver segment can be driven by the rack and pinion gear, a simplified structure can result yet enhancing reliability of the driver segment feed mechanism.

Preferably, the driver segment has a fastener driving end and an opposite end. The fastener driver further includes a driver segment feed mechanism provided between the driven rotor and the driver segment for converting a rotary motion of the driven rotor into a linear motion of the driver segment in a direction from the opposite end to the fastener driving end. The feed mechanism includes a wire having one end fixed to the opposite end, and another end fixed to the driven rotor. Since the rotational force of the driven rotor can be transmitted to the driver segment through the wire, a light-weight driver segment feed mechanism can be provided.

In another aspect of the invention, there is provided an electric fastener driver including a housing, a motor, a magazine, a flywheel, a driven rotor, a driver segment, a clutch mechanism, and a solenoid plunger. The housing has a fastener driving side. The motor is disposed in the housing. The magazine is attached to the housing for supplying a fastener to the fastener driving side. The flywheel is rotatably supported to the housing and is driven by the motor. The driven rotor is rotatably supported to the housing and provides an interior hollow space. The driver segment is driven by the driven rotor. The clutch mechanism selectively couples the flywheel to the driven rotor. The solenoid plunger is disposed within the interior hollow space. With this arrangement, a compact device can be provided by disposing the solenoid plunger in the driven rotor.

Preferably, the solenoid plunger is associated with the clutch mechanism for driving the clutch mechanism. With this arrangement, operation of the clutch mechanism can be accurately controlled because of the actuation of the clutch mechanism using the solenoid plunger.

Preferably, the electric fastener driver further includes a coil spring that transmits a rotation force of the flywheel to the driven rotor. The driven rotor is of a cylindrical shape and is formed with a through-hole extending in a radial direction thereof. The clutch mechanism includes a contact piece movable in the through-hole for urging the coil spring to couple the coil spring to the driven rotor. With this arrangement, a smaller space is sufficient for providing the clutch mechanism, thereby making the entire device compact.

In still another aspect of the invention, there is provided an electric fastener driver including a housing, a motor, a magazine, a flywheel, a drive shaft, a driven rotor, a driver segment, a coil spring, and a clutch mechanism. The housing has a fastener driving side. The motor is disposed in the housing. The magazine is attached to the housing for supplying a fastener to the fastener driving side. The flywheel is rotatably supported to the housing and is driven by the motor. The drive shaft is provided at the flywheel and has an outer peripheral surface. The driven rotor is rotatably supported to the housing and is axially arrayed with and coaxial with the drive shaft. The driven rotor has an outer peripheral surface. The driver segment is driven by the driven rotor. The coil spring transmits a rotation force of the drive shaft to the driven rotor. The clutch mechanism selectively couples the drive shaft to the driven rotor through the coil spring for selectively rotating the driven rotor. The drive shaft provides an outer diameter at a side of the driven rotor equal to an outer diameter of the driven rotor at a side of the drive shaft. The outer peripheral surface of the drive shaft is continuous with the outer peripheral surface of the driven shaft.

With this arrangement, the driven rotor is coupled to the drive shaft through the coil spring upon actuation of the clutch mechanism. In this case, power connection and disconnection between the coil spring and the driven rotor can be made by the clutch mechanism while the coil spring is already fixed to the drive shaft. Alternatively, power connection and disconnection between the coil spring and the drive shaft can be made by the clutch mechanism while the coil spring is already fixed to the driven rotor. Since the coil spring connects the driven rotor to the drive shaft upon actuation of the clutch mechanism, the coil spring can be tightly wound over the driven rotor or over the drive shaft. In this case, since the outer diameters of the drive shaft and the driven rotor are equal to each other at the boundary region therebetween, and since the outer peripheral surfaces of the driven rotor and the drive shaft are continuous with each other, winding and tightening motion of the coil spring can be properly performed avoiding axial deformation thereof. Accordingly, a prolonged service life of the coil spring is attainable.

BRIEF DESCRIPTION OF DRAWINGS

In the drawings;

FIG. 5(*b*) is a front view of the coil spring;

BEST MODE FOR CARRYING OUT THE INVENTION

Figure 1:
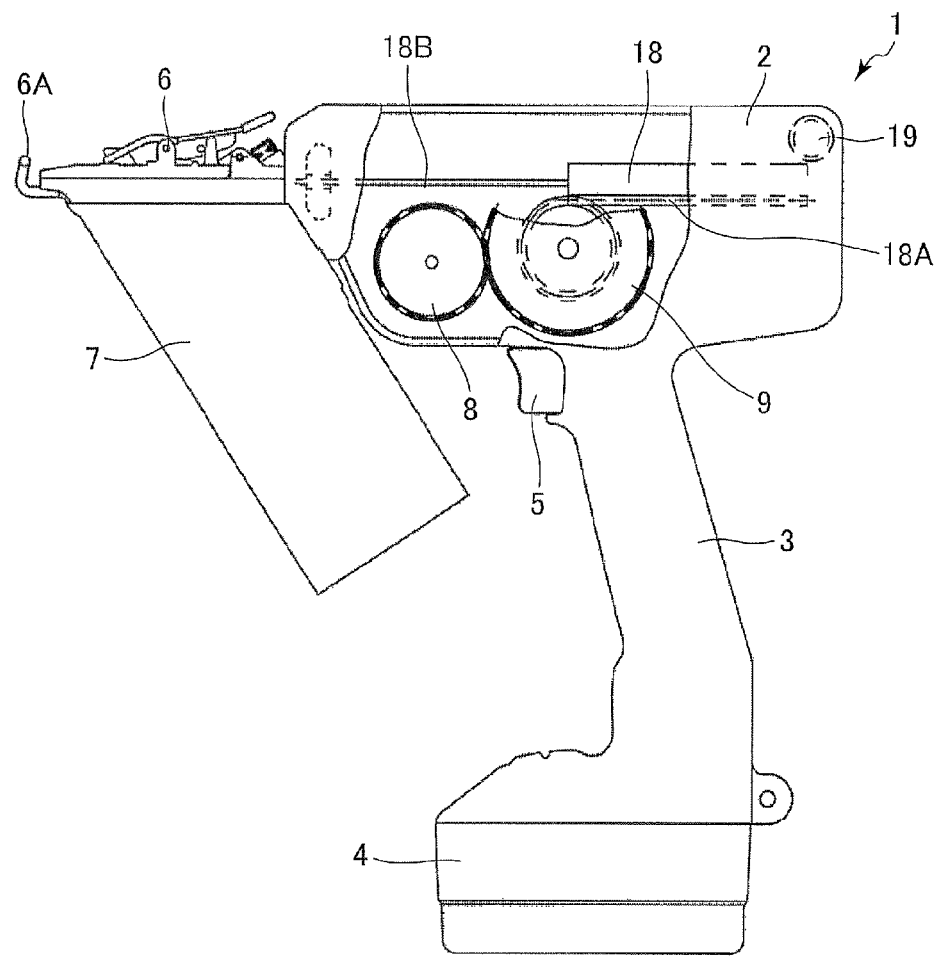
FIG. 1 is a side view partially cut away of an electrically powered fastener driver according to a first embodiment of the present invention.

An electrically powered fastener driver according to a first embodiment of the present invention will be described with reference to FIGS. 1 through 8. The fastener driver 1 mainly includes a housing 2 as an outer frame, a handle 3, a battery pack 4, a nose 6 at a front end of i.e., a driving side of the housing 2, and a magazine 7.

A motor 8, a driver segment 18, and a return spring 19 for returning the driving segment are housed in the housing 2. The driver segment 18 is movable in a range between the front side and a rear side of the housing 2 and is guided by a rail (not shown) disposed in the housing 2. The driver segment 18 has a front side provided with a driver blade 18B extendable into a passage (not shown) formed in the nose 6 when the driver segment 18 is moved to the front side of the housing. The return spring 19 is positioned at a rear side within the housing, and has one end attached to the driver segment 18 for biasing the driver segment 18 toward the rear side of the housing. The driver segment 18 has a handle side provided with a rack 18A.

The handle 3 serving as a grip portion extends from side surfaces of the housing 2. The handle 3 has a base end where a trigger 5 is provided for controlling the driver segment 18. The battery pack 4 is disposed at a free end of the handle 3. The battery pack 4 is adapted for supplying an electric power to the motor 8 through a wiring (not shown) provided in the handle 3.

The nose 6 is formed with the passage (not shown) allowing the driver blade 18B to pass therethrough. The passage extends from the side of the housing 2 to the tip end of the nose 6. The nose 6 has the front side provided with a push lever 6A movable when a tip end of the push lever 6A presses against a workpiece which is a target to be driven with the fastener. Fastener driving operation is only permitted when the push lever 6A is pressed against the workpiece.

The magazine 7 is spanned between the nose 6 and the front end portion of the housing 2. A bundle of fasteners such as nails (not shown) are accommodated in the magazine 7, and each one of the nails is successively supplied to the passage in the nose 6. When the driver segment 18 is moved frontward, a nail positioned in the passage of the nose 6 is pushed out by the driver blade 18B and is driven into the workpiece.

Figure 2:
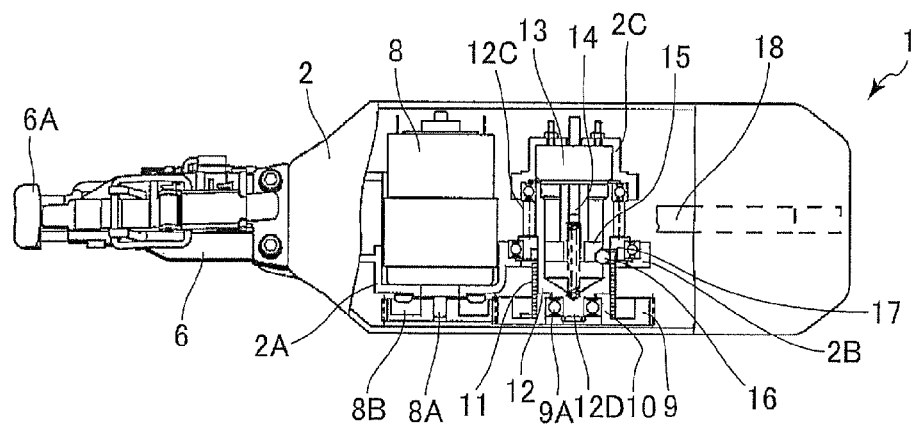
FIG. 2 is a plan view partially cut away of the electrically powered fastener driver according to the first embodiment.

Next, a power transmission mechanism for transmitting an output of the motor 8 to the driver segment 18 will be described in detail. As shown in FIG. 2, in the housing 2, there are provided a first wall 2A at a front side of the housing 2, a second wall 2B at a rear side of the first wall 2A and integral therewith, and a third wall 2C arrayed with the second wall 2B in a direction perpendicular to the frontward/rearward direction of the housing 2. The motor 8 is fixed to the first wall 2A such that a motor shaft 8A of the motor 8 extends in a direction perpendicular to the moving direction of the driver segment 18. A gear 8B is concentrically mounted on the motor shaft 8A. The motor shaft 8A and gear 8B are rotatable in a clockwise direction.

Figure 3:
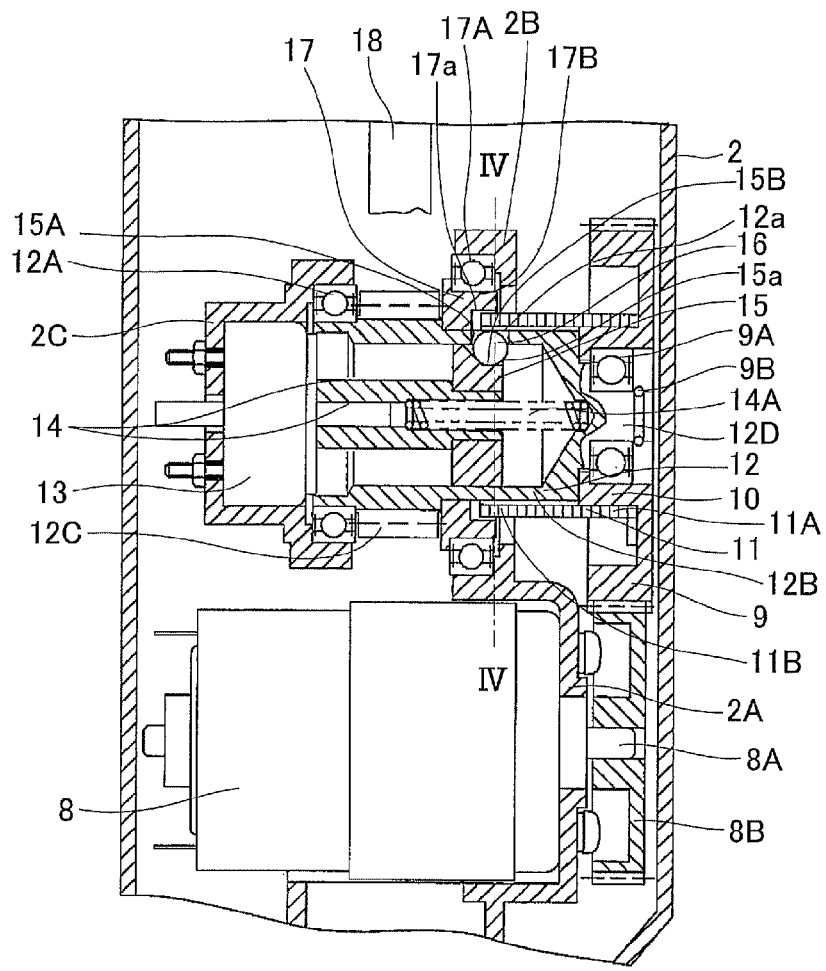
FIG. 3 is a cross-sectional view particularly showing an internal structure of the electrically powered fastener driver according to the first embodiment.

As shown in FIG. 3, a driven rotor 12 is rotatably supported to the second wall 2B through a bearing 17A. The driven rotor 12 is of a generally cylindrical shape and extends parallel to the motor shaft 8A. The driven rotor 12 is also rotatably supported to the third wall 2C through a bearing 12A. Since the driven rotor 12 is rotatably supported at two locations, stabilized rotation of the driven rotor 12 can be obtained even if an external load is rapidly applied to the rotor. Further, the third wall 2C also supports a solenoid 13 described later.

A pinion gear 12C is fixed to an outer peripheral surface of the driven rotor 12 at a position between the bearings 12A and 17A. The rack 18A (FIG. 1) of the driver segment 18 is in meshing engagement with the pinion gear 12C. The pinion gear 12C and the rack 18A constitute a driver segment feed mechanism.

As shown in FIG. 3, an annular support 17 is fitted with the outer peripheral surface of the driven rotor 12. Thus, the driven rotor 12 is supported by the bearing 17A through the annular support 17. The annular support 17 has a generally L-shape cross-section including a fitting section fitted with the driven rotor 12 and a spring seat section 17B extending from the fitting section in an axial direction of the driven rotor 12. Thus, an annular groove 17a is formed whose groove surfaces are defined by the inner peripheral surface of the spring seat section 17B, the outer peripheral surface of the driven rotor 12, and an axial end face of the fitting section.

A bore 12a extends through a thickness of the driven rotor 12 at a position in confrontation with the spring seat section 17B. A ball 16 (described later) is insertable into the bore 12a. When the ball 16 is inserted into the bore 12a, the movement of the ball 16a in an expanding and shrinking direction of a solenoid plunger 14 (described later) and in a circumferential direction of the driven rotor 12 is prevented, while the movement of the ball 16a in a radial direction of the driven rotor 12 is permitted.

The solenoid 13 is disposed at one end of the driven rotor 12 and is covered with the third wall 2C. The solenoid plunger 14 extends from the solenoid 13 into an internal space of the driven rotor 12. The solenoid plunger 14 expands upon application of electric current to the solenoid 13. A plunger return spring 14A is interposed between an end of the solenoid plunger 14 and the driven rotor 12 in the expanding/shrinking direction of the plunger 14 for urging the solenoid plunger 14 toward its shrinking direction.

The solenoid plunger 14 has a free end provided with a cylindrical urging section 15. The urging section 15 is rotatable with respect to the solenoid plunger 14 about an axis thereof. The urging section 15 is formed with a groove extending in an axial direction of the plunger 14. The groove has a pressing wall 15A and a receiving wall 15B. The pressing wall 15A is constituted by a slant wall and serves as a pressing surface. A distance between the slant wall and the axis of the plunger 14 is gradually increased toward the solenoid 14. An outer diameter of the urging section 15 is slightly smaller than an inner diameter of the driven rotor 12.

A gap 15a is defined by the pressing wall 15A, receiving wall 15B and the inner peripheral surface of the driven rotor 12 for receiving the ball 16. A sum of a distance between the surface of the receiving wall 15B and the inner surface of the driven rotor 12 and a length of the bore 12a (a radial thickness of the driven rotor 12) is approximately equal to a diameter of the ball 16. A clutch mechanism is constituted by the urging section 15 and ball 16.

Figure 4:
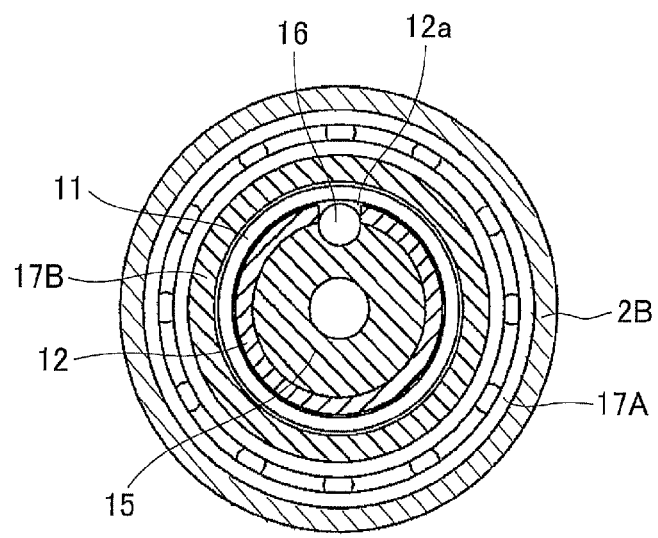
FIG. 4 is a cross-sectional view taken along the line IV-IV of FIG. 3.
Figure 6:
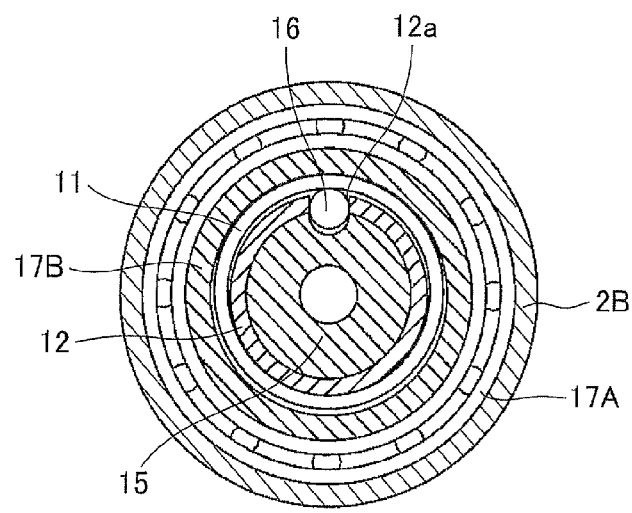
FIG. 6 is a cross-sectional view taken along the line VI-VI of FIG. 7.
Figure 7:
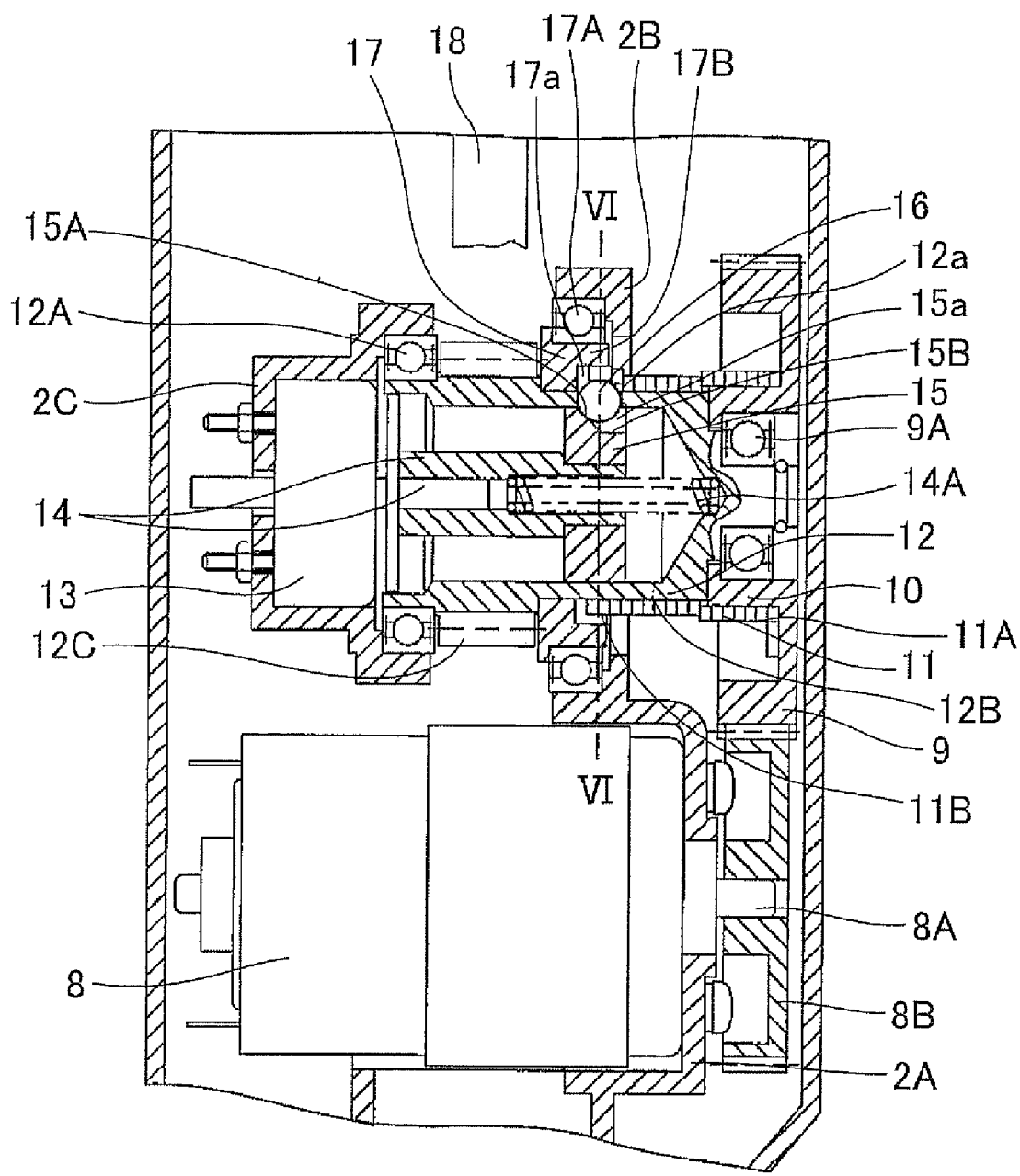
FIG. 7 is cross-sectional view showing a coupling state between the coil spring and a driven rotor in the electrically powered fastener driver according to the first embodiment.

The expansion and retraction amount of the solenoid plunger 14 is adjusted such that the surface of the receiving wall 15B is aligned with the bore 12a when the solenoid plunger 14 is at most retracted state, i.e., at power transmission shut off position, and the surface of the pressing wall 15A is aligned with the bore 12a when the solenoid plunger 14 is at most expansion state, i.e., at power transmission position. In the shut off position, the ball 16 is in contact with the receiving wall 15B, so that a part of the ball 16 does not protrude from the outer peripheral surface of the driven rotor 12 as shown in FIGS. 3 and 4. On the other hand, in the power transmission position, the ball is in contact with the pressing wall 15A, so that a part of the ball 16 protrudes from the outer peripheral surface of the driven rotor 12 as shown in FIGS. 6 and 7. Incidentally, the part of the ball 16 may protrude from the outer peripheral surface of the driven rotor 12 in the shut-off phase due to own gravity of the ball 16 by inclination of the fastener driver 1. However, since the ball 16 is not in contact with the pressing wall 15A, the ball 16 does not positively press a coil spring 11 (described later).

The driven rotor 12 has another end portion defining a spring seat portion 12B at a position rightward of the bore 12a in FIG. 3. Further, a support shaft 12D is provided at a distal end of the other end portion of the driven rotor 12. The support shaft 12D is aligned with the gear 8B in the axial direction of the driven rotor 12. A flywheel 9 is rotatably supported to the support shaft 12D through a bearing 9A.

Since the driven rotor 12 is supported rotatably about the axis of the solenoid plunger 14 with respect to the second wall 2B and third wall 2C of the housing 2 through the bearings 12A and 17A, the flywheel 9 is not only rotatable with respect to the driven rotor 12, but also rotatably supported to the housing 2 through the bearing 9A and the support shaft 12D of the driven rotor 12. A snap ring 9B is attached to the end portion of the support shaft 12D in order to prevent the bearing 9A from being moved in the axial direction thereof.

The flywheel 9 has an outer peripheral surface formed with gear teeth meshedly engaged with the gear 8B. In accordance with the rotation of the gear 8B in a clockwise direction, the flywheel 9 is rotated in a counterclockwise direction. The flywheel 9 has a radially inner section serving as a drive shaft portion 10 concentric with the driven rotor 12. In other words, the drive shaft portion 10 is concentric with the flywheel 9 and is integral therewith. An outer diameter of the drive shaft portion 10 is slightly greater than an outer diameter of the spring seat portion 12B.

The coil spring 11 has a base end 11A fixed to the outer peripheral surface of the drive shaft 10 such that the coil spring 11 is concentric with the drive shaft 10. The coil spring 11 has a free end 11B positioned within the annular groove 17a and between the spring seat portion 12B and the annular support 17.

Figure 5A:
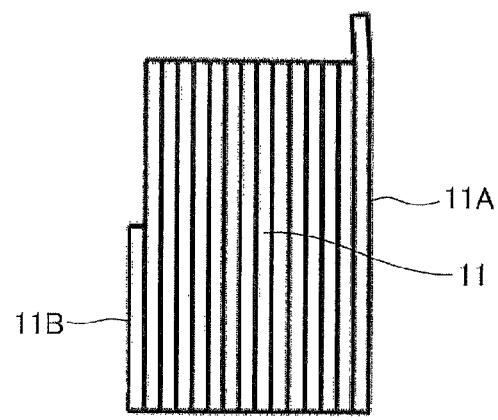
FIG. 5(*a*) is a side view showing a coil spring used in the electrically powered fastener driver according to the first embodiment.
Figure 5B:
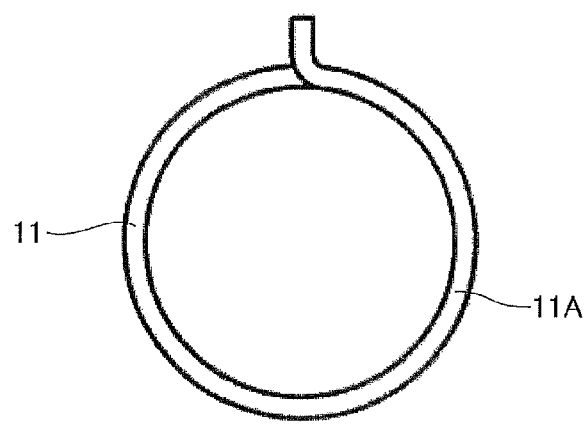

The coil spring 11 is made from a steel wire and is wound in a dense manner such that neighboring coil circles are in contact with each other as shown in FIG. 5a. Further, the coil spring 11 is wound in a clockwise direction (FIG. 5b) as viewed from one end 11A to another end 11B of the coil spring 11. Thus, a spiral direction of the coil spring 11 is opposite to the rotating direction of the flywheel 9.

An inner diameter of the coil spring 11 is approximately equal to the outer diameter of the drive shaft 10 when the coil spring 11 is at free state. Since the outer diameter of the spring seat portion 12B is smaller than the outer diameter of the drive shaft 10, the coil spring 11 is out of connection from the driven rotor 12 when electrical current is not applied to the motor 8.

Fastener driving operation will next be described. First, an operator pulls the trigger 5 along with pushing the push lever 6A against the workpiece. Alternatively, the operator pulls the trigger 5 after the push lever 6A is pressed against the workpiece. As a result, electric current from the battery 4 is applied to the motor 8 for starting rotation of the motor 8. Thus, rotation of the flywheel 9, drive shaft 10 and coil spring 11 are also started. By way of driving by the motor 8, angular velocity of the flywheel 9 is increased, so that rotational kinetic energy will be accumulated in the flywheel 9. In this state, since the coil spring 11 is separated from the driven rotor 12 as shown in FIGS. 3 and 4, the driven rotor 12 does not rotate. In other words, no friction is generated between the coil spring 11 and the driven rotor 12.

Sufficient driving energy for driving the driver segment 18 is accumulated in the flywheel 9, after elapse of a predetermined time period from the start timing of the rotation of the motor 8. In this instance, a driver circuit (not shown) is operated to energize the solenoid 13, so that the solenoid plunger 14 expands against the biasing force of the plunger return spring 14A. During this period, the ball 16 having been rested on the receiving wall 15B will be pressed by the pressing wall 15A in the gap 15a.

Since the pressing wall 15A is slanted and since the ball 16 is immovable in the axial direction of the plunger 14, the ball 16 will be urged radially outwardly in response to the extension of the solenoid plunger 14, so that the part of the ball 16 protrudes out of the outer peripheral surface of the driven rotor 12 as shown in FIG. 6.

The other end 11B of the coil spring 11 is located near the surface of the spring seat portion 12B of the driven rotor 12. A first part of the other end 11B of the coil spring 11 will be urged radially outwardly of the driven rotor 12 by the ball 16. Consequently, a second part of the other end 11B (the second part being diametrically opposite side of the first part directly pressed by the ball 16) will be moved radially inward of the driven rotor 12, so that the second part will be brought into contact with the spring seat portion 12B. Thus, friction will be generated between the rotating other end 11B of the coil spring 11 and the spring seat portion 12B. Incidentally, since the part of the ball 16, the part being a spherical region, is in contact with the other end portion 11B, frictional wearing of the ball 16 and the other end portion 11B can be avoided when the ball 16 is in pressure contact with the end portion 11B.

Further, since the spring seat section 17B is provided at a position in confrontation with the bore 12a in the diametrical direction of the driven rotor 12, the other end of 11B of the coil spring 11 is urged by the ball 16 and is nipped between the ball 16 and the spring seat section 17B.

Thus, a resistance against rotation is generated between the driven rotor 12 and the other end 11B of the coil spring 11 because of the friction force and nipping force. Since the rotating direction of the coil spring 11 is opposite to the spiral direction thereof, the other end 11B of the coil will be moved toward the rotating direction of the driven rotor while one end 11A of the coil 11 is fixed to the drive shaft 10 so that inner diameter of the coil 11 will be reduced as shown in FIG. 7.

Figure 8:
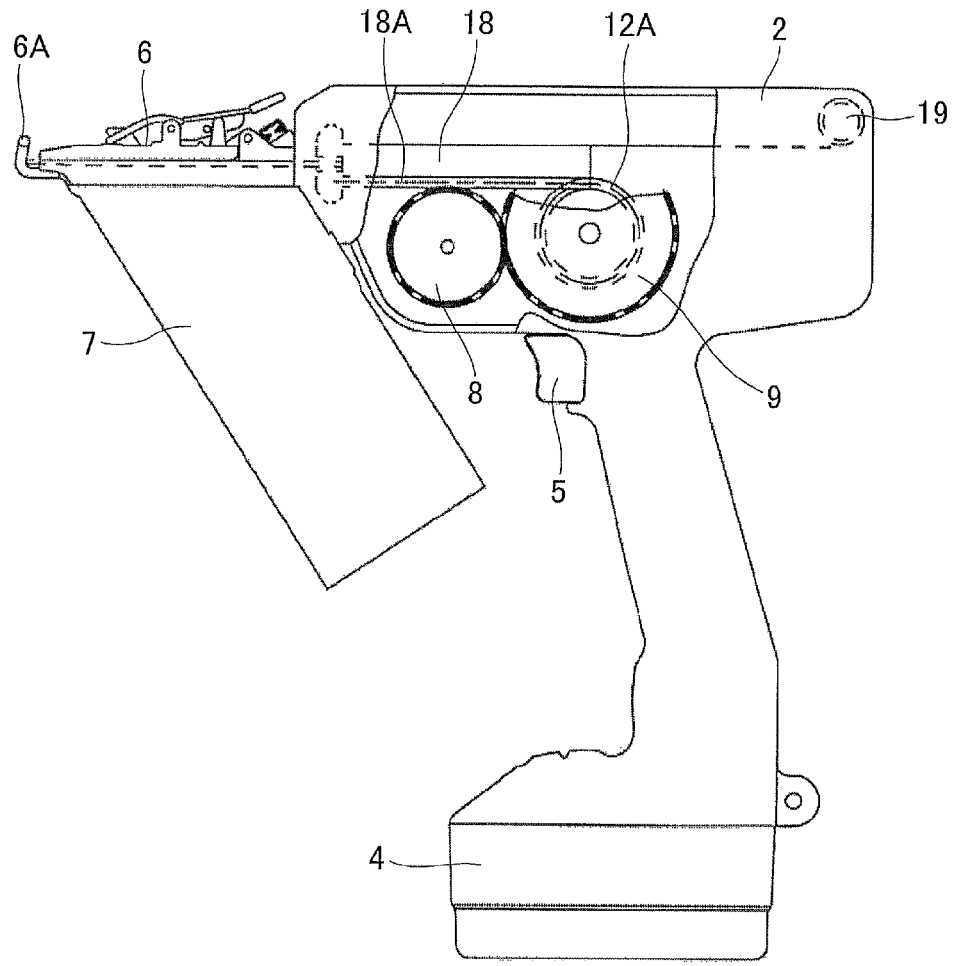
FIG. 8 is a side view partially cut away showing a terminal phase of a fastener driving operation in the electrically powered fastener driver according to the first embodiment.
Figure 9A:
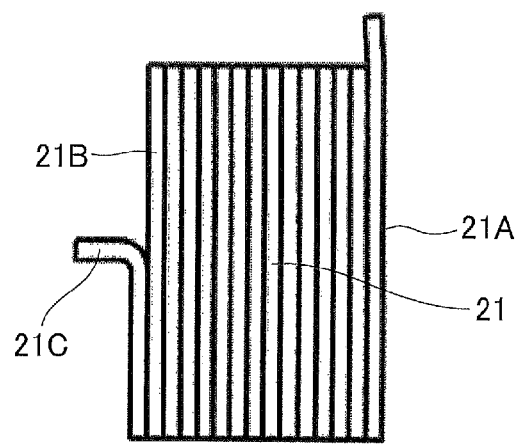
FIG. 9(a) is a side view showing a coil spring used in an electrically powered fastener driver according to a second embodiment of the present invention.
Figure 9B:
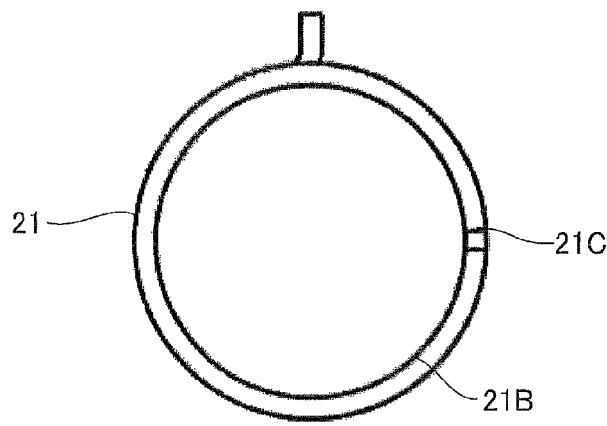
FIG. 9(b) is a rear view of the coil spring in the second embodiment.

Because of the reduction in inner diameter of the coil 11, friction force between the coil spring 11 and the driven rotor 12 is further increased. Within a several ten millimeter seconds, the coil spring 11 is drivingly connected to the driven rotor 12, so that the driven rotor 12 will be rotated together with the coil spring 11 and drive shaft 10. In this case, since the urging section 15 is rotatable relative to the solenoid plunger 14 and is drivingly connected to the driven rotor 12 by way of the ball 16, the urging section 15 will be rotated together with the driven rotor 12. Further, since the driven rotor 12 has the pinion gear 12C meshedly engaged with the rack 18A of the driver segment 18, the driver segment 18 will be linearly moved toward the front end of the housing 2 in accordance with the rotation of the driven rotor 12 as shown in FIG. 8.

Since not only the output of motor 8 but also rotational energy of the flywheel 9 are transmitted to the driven rotor 12, the driven rotor 12 can be promptly rotated at high speed through the connection to the coil spring 11. Consequently, the driver segment 18 can be promptly displaced toward the front end of the housing 2 against the biasing force of the return spring 19, so that the driver blade 18B at the front side of the driver segment 18 drives a fastener (not shown) into the workpiece at high speed.

Upon completion of the driving of the fastener into the workpiece, electric power supply to the solenoid 13 is shut off, and the solenoid plunger 14 will be displaced to its retracted position because of the biasing force of the solenoid return spring 14A. Since the urging section 15 is also moved, the ball 16 will be seated on the receiving wall 15B. Accordingly, the other end 11B of the coil spring 11 will be free from the ball 16 and spring seat section 17B, and will out of contact from the driven rotor 12. Consequently, inner diameter of the coil spring 11 will be restored to its original inner diameter, so that squeezing force of the coil spring 11 to the spring seat portion 12B of the driven rotor 12 will be released. Thus, driving connection between the coil spring 11 and the driven rotor 12 will be shut off.

After the separation of the coil spring 11 from the driven rotor 12, the driver segment 18 will be moved back to its retracted position because of the biasing force of the return spring 19, since no frontward force is imparted to the driver segment 18.

A fastener driver according to a second embodiment of the present invention will be described with reference to FIGS. 8 through 13. The second embodiment provides a construction the same as that of the first embodiment except a coil spring 21 shown in FIGS. 9a and 9b. Therefore, only the coil spring 21 will be described to avoid duplicating description. The coil spring 21 has one end 21A identical to one end of the coil spring 11 of the first embodiment, and another end 21B which is not inserted into the annular groove 17a but has a protrusion 21C extending in the axial direction of the coil spring 21.

Figure 10:
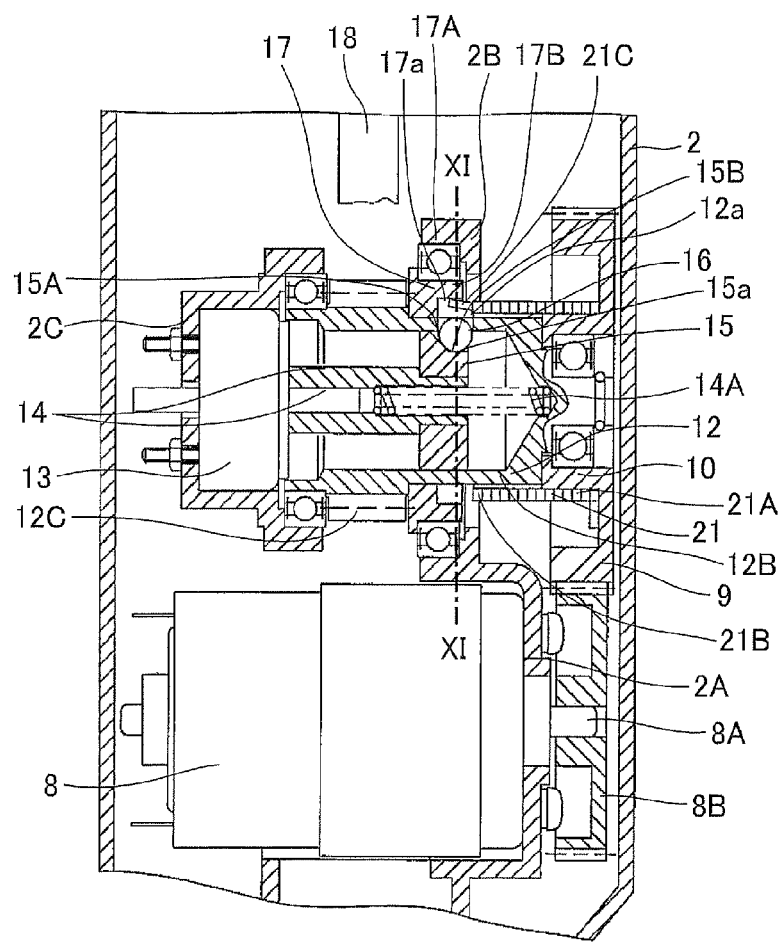
FIG. 10 is a cross-sectional view particularly showing an internal structure of the electrically powered fastener driver according to the second embodiment.

As shown in FIG. 10, while the coil spring 21 is disposed over the spring seat portion 12B of the driven rotor 12, the other end 21B of the coil spring 21 is not entered into the annular groove 17a, but only the protrusion 21C is entered into the annular groove 17a.

Figure 11:
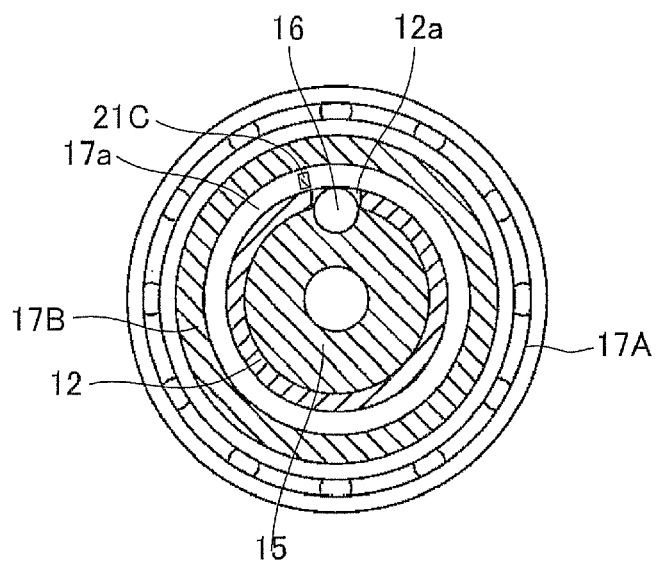
FIG. 11 is a cross-sectional view taken along the line XI-XI of FIG. 10.
Figure 12:
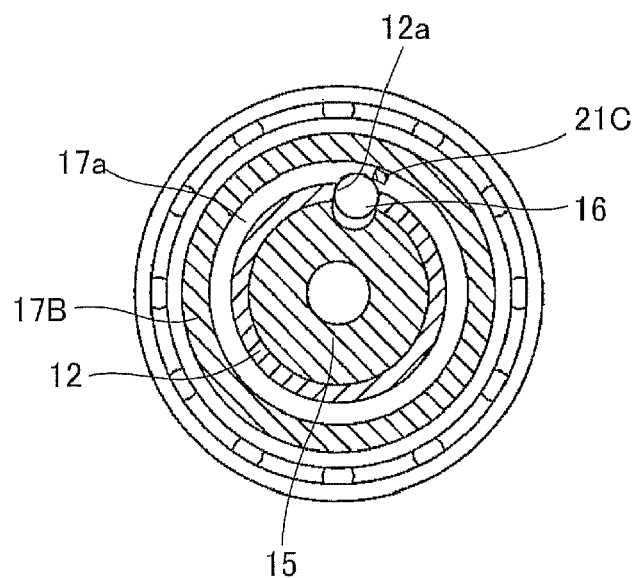
FIG. 12 is a cross-sectional view taken along the line XII-XII of FIG. 13.
Figure 13:
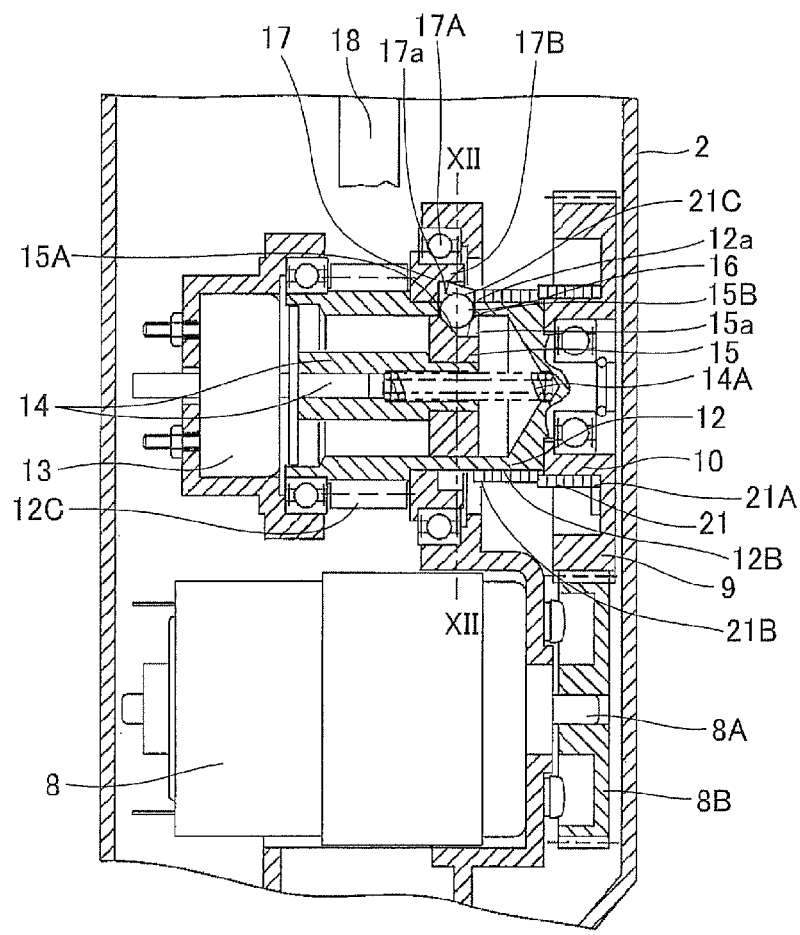
FIG. 13 is cross-sectional view showing a coupling state between the coil spring and a driven rotor in the electrically powered fastener driver according to the second embodiment.

As shown in FIG. 11, if the part of the ball 16 does not protrudes out of the outer peripheral surface of the spring seat portion 12B, the protrusion 21C does not abut against the ball 16 within the annular groove 17a. On the other hand, if the part of the ball 16 protrudes out of the outer peripheral surface of the spring seat portion 12B as shown in FIG. 12, the protrusion 21C cannot be passed through a gap between the ball 16 and the spring seat section 17B, but is latched between the ball 16 and the spring seat section 17B. As a result, similar to the first embodiment, an inner diameter of the coil spring 21 will be reduced to drivingly connect the coil spring 21 to the driven rotor 12 as shown in FIG. 13. Thus, the driver segment 18 is shifted frontward for driving the fastener. Incidentally, the part of the ball 16 may protrude out of the bore 12a because of its gravity due to inclination of the tool 1. However, since the ball 16 is not supported by the pressing wall 15A, no urging force will be applied to the ball 16 so that the coil spring 21 will not be urged.

With this arrangement, initial connection between the coil spring 21 and driven rotor 12 can be performed without any aid of frictional force. Therefore, frictional wearing of the ball 16 and the coil spring 21 can further be reduced.

Figure 14:
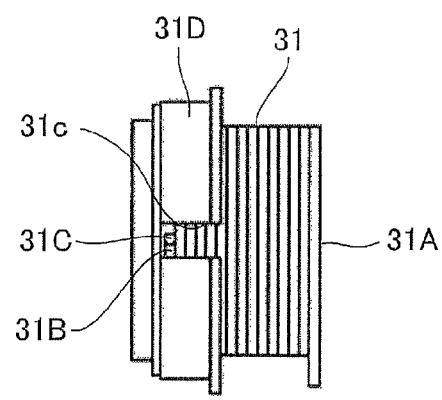
FIG. 14 is a side view showing a coil spring used in an electrically powered fastener driver according to a third embodiment of the present invention.

A fastener driver according to a third embodiment of the present invention will be described with reference to FIGS. 14 through 18. As shown in FIG. 14, the third embodiment employs a coil spring 31 and a flange segment 31D at another end 31B of the coil spring 31. Remaining construction is the same as that of the first embodiment, and therefore, further description will be omitted. The flange segment 31D has generally annular shape formed with a notch 31c at a circumferential portion thereof. The other end portion 31B of the coil spring 31 is concentrically disposed within an interior of the flange segment 31D. The other end 31B has a protrusion 31C extending through the notch 31c. Thus, the coil spring 31 and the flange segment 31D are integrally rotatable in the rotational direction of the coil spring 31.

Figure 15:
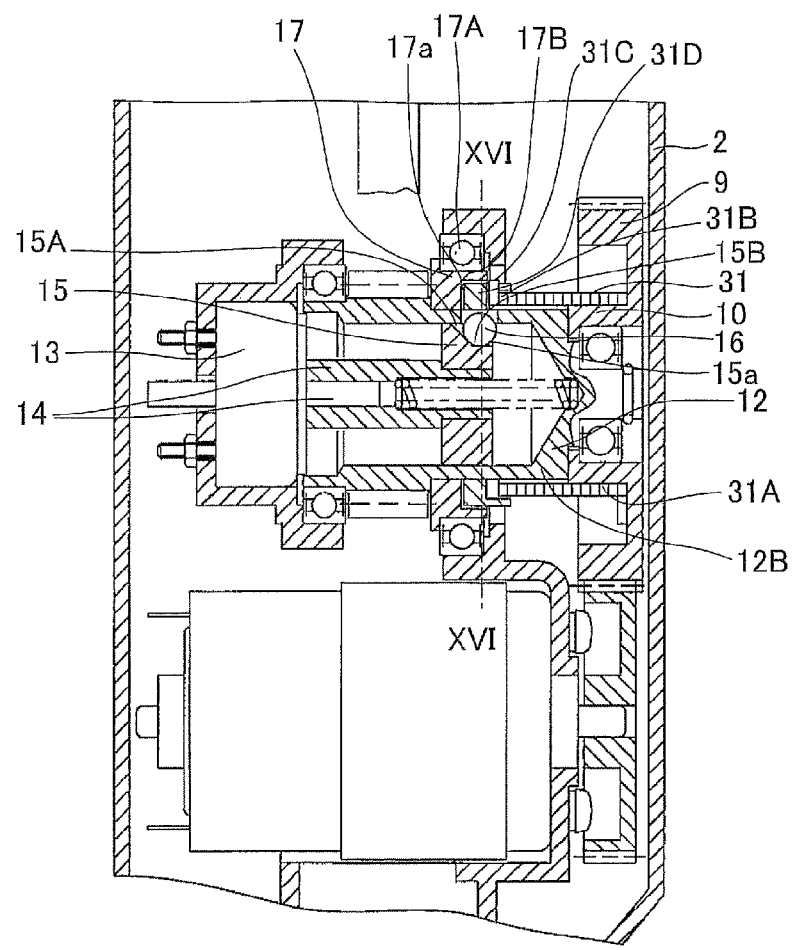
FIG. 15 is a cross-sectional view particularly showing an internal structure of the electrically powered fastener driver according to the third embodiment.

As shown in FIG. 15, one end 31A of the coil spring 31 is fixed to the drive shaft 10, while the spring seat portion 12B of the driven rotor 12 is positioned within the coil spring 31. In this state, the flange segment 31D is positioned within the annular groove 17a.

Figure 16:
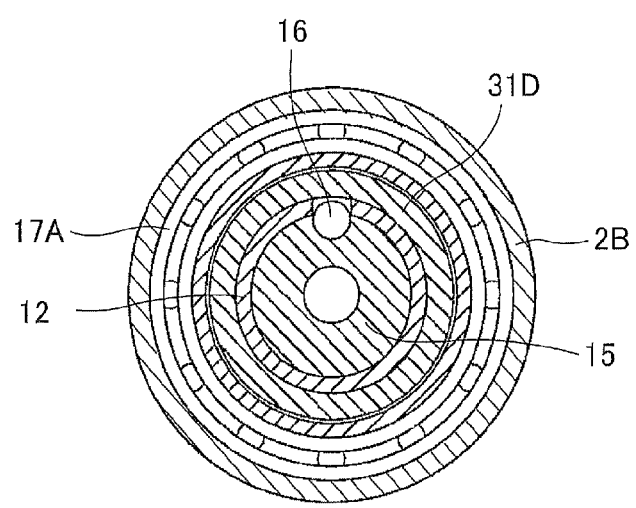
FIG. 16 is a cross-sectional view taken along the line XVI-XVI of FIG. 15.
Figure 18:
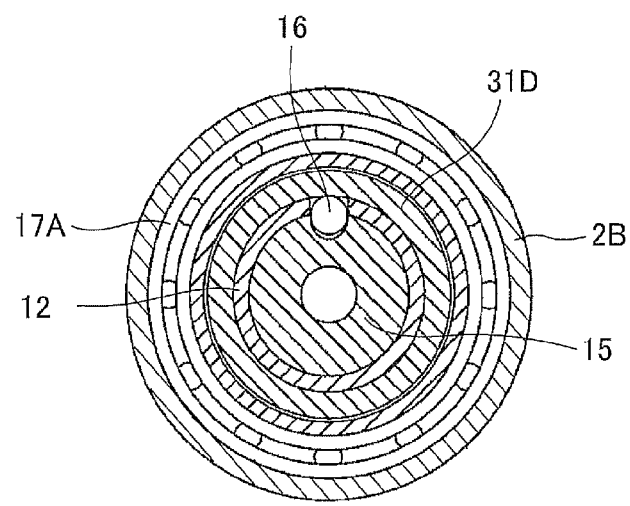
FIG. 18 is a cross-sectional view taken along the line XVII-XVII of FIG. 17.

As shown in FIG. 16, if the part of the ball 16 does not protrude from the outer peripheral surface of the spring seat portion 12B, the flange segment 31D is rotatable relative to the annular groove 17a. On the other hand, if the part of the ball 16 protrudes from the outer peripheral surface of the spring seat portion 12B as shown in FIG. 18, the ball 16 is brought into pressure contact with the flange segment 31D, and further, an opposite part of the flange segment 31D (the opposite part being diametrically opposite side of the contacting part with the ball 16) will be brought into contact with the surface of the spring seat portion 12B. Thus, frictional force will be generated at the contacting portions. Incidentally, the ball 16 may protrude out of the bore 12a because of its gravity due to inclination of the tool 1. However, no positive urging force is applied to the flange segment 31D as long as the ball 16 is not supported on the pressing wall 15A.

Figure 17:
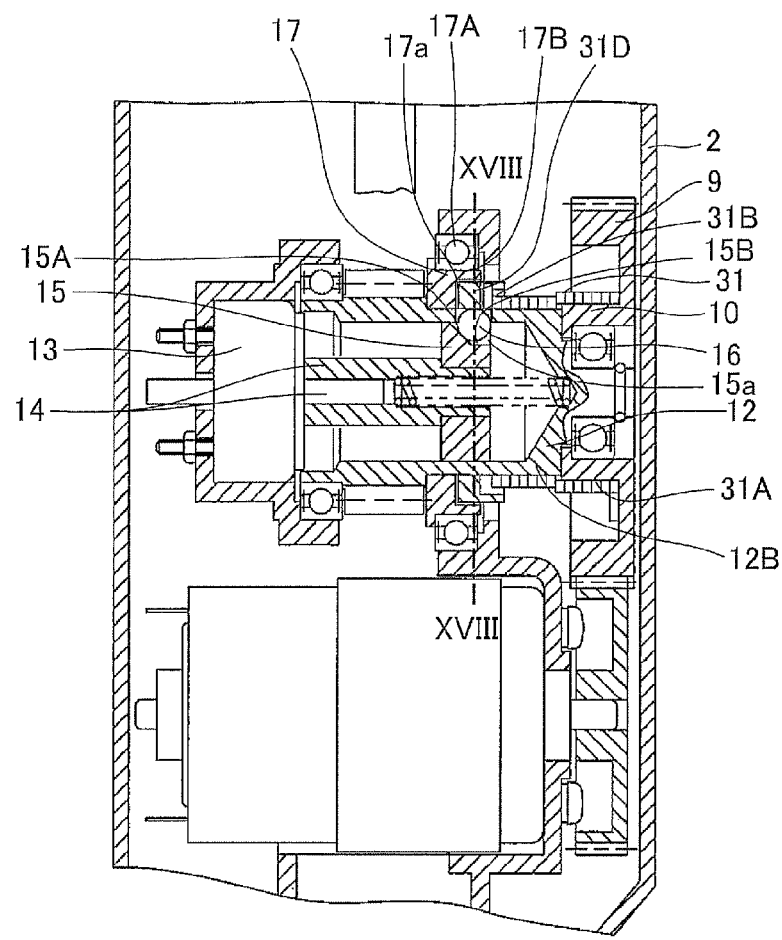
FIG. 17 is cross-sectional view showing a coupling state between the coil spring and a driven rotor in the electrically powered fastener driver according to the third embodiment.

As a result, similar to the coil spring 11 of the first embodiment, an inner diameter of the coil spring 31 will be reduced to drivingly connect the coil spring 31 to the driven rotor 12 (FIG. 17). Accordingly, the driver segment 18 can be moved frontward for driving the fastener.

According to the arrangement, a material of the flange segment 31D can be selected such that a rigidity and hardness of the flange segment 31D can be higher than those of the coil spring made from a steel. Consequently, a pressure contact between the flange segment 31D and the springs seat portion 12B will generate a greater friction and lesser frictional wearing in comparison with a pressure contact between the coil spring and the spring seat portion 12B. Since accidental slippage between the flange section 31D and the spring seat portion 12B against the friction hardly occurs, a time period from the energization timing of the solenoid plunger 14 to the connection timing between the coil spring 31 and the driven rotor 12 can be reduced.

Figure 19:
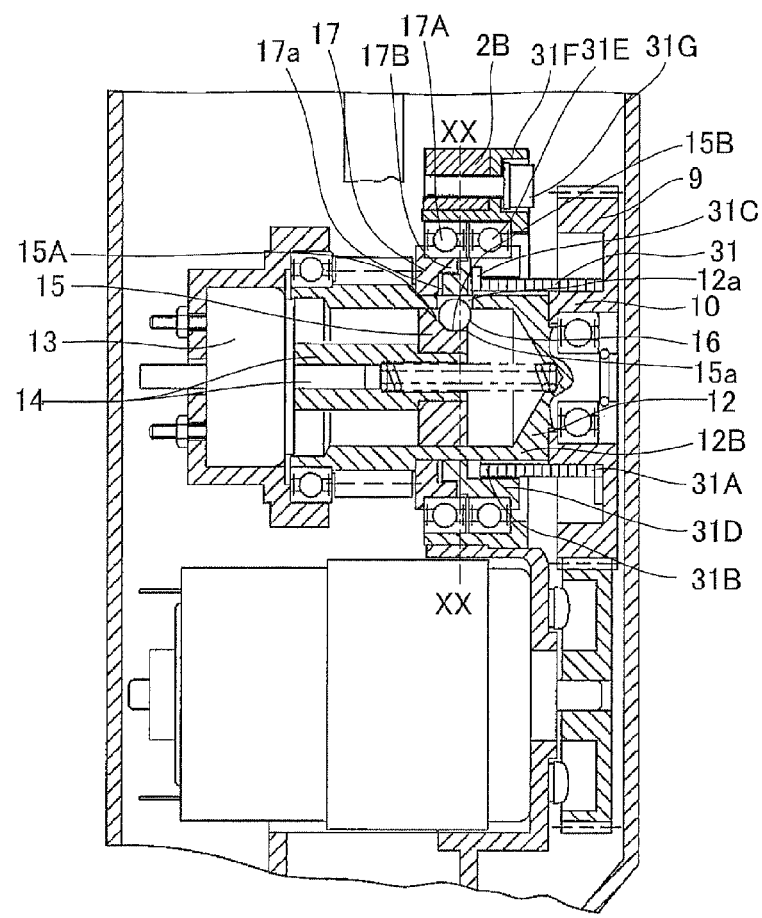
FIG. 19 is a cross-sectional view particularly showing an internal structure of the electrically powered fastener driver according to a fourth embodiment of the present invention.
Figure 20:
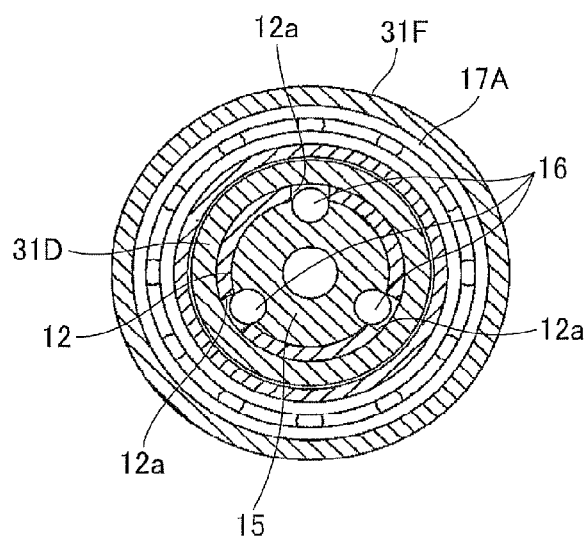
FIG. 20 is a cross-sectional view taken along the line XX-XX of FIG. 19.

A fastener driver according to a fourth embodiment of the present invention will be described with reference to FIGS. 19 through 22. In the fourth embodiment as shown in FIGS. 19 and 20, three bores 12a are formed in the driven rotor 12 at trisection in the circumferential direction thereof and at identical position in the axial direction of the driven rotor 12. Each bore 12a receives a ball 16.

As shown in FIG. 19, a bearing holder 31F is fixed to the second wall 2B through a screw 31G, and a bearing 31E is juxtaposed with the bearing 17A. The bearings 17A and 31E are force-fitted with the bearing holder 31F. The flange segment 31D is disposed at the other end of the coil spring 31, and is rotatably supported by the bearing 31E.

Figure 21:
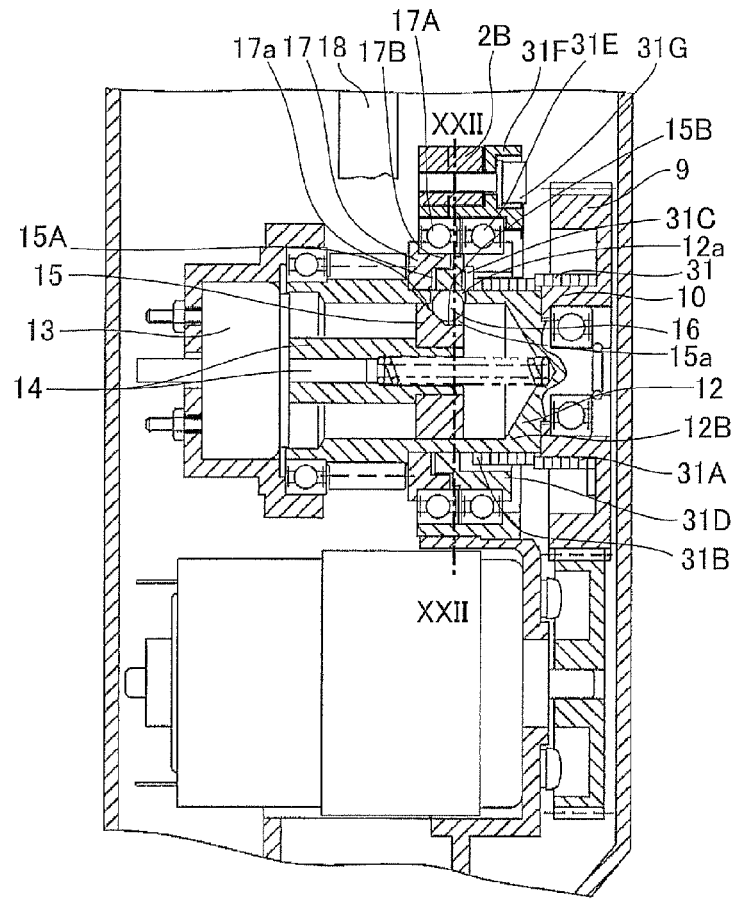
FIG. 21 is cross-sectional view showing a coupling state between a coil spring and a driven rotor in the electrically powered fastener driver according to the fourth embodiment.
Figure 22:
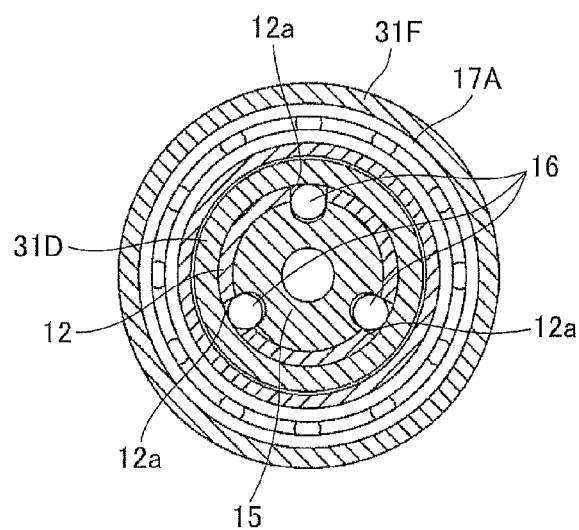
FIG. 22 is a cross-sectional view taken along the line XXII-XXII of FIG. 21.

As shown in FIGS. 19 and 20, if each part of each ball 16 does not protrude from the outer peripheral surface of the spring seat portion 12B, the flange segment 31D is rotatable relative to the annular groove 17a. On the other hand, if each part of each ball 16 protrudes from the outer peripheral surface of the spring seat portion 12B as shown in FIGS. 21 and 22 by the pressing wall 15A, each ball 16 is brought into pressure contact with the flange segment 31D, to generate friction therebetween. Incidentally, the ball 16 may protrude out of the bore 12a because of its gravity due to inclination of the tool 1. However, no positive urging force is applied to the flange segment 31D as long as the ball 16 is not supported on the pressing wall 15A.

As a result, similar to the coil spring 11 of the first embodiment, an inner diameter of the coil spring 31 will be reduced to drivingly connect the coil spring 31 to the driven rotor 12 (FIG. 21). Accordingly, the driver segment 18 can be moved frontward for driving the fastener.

According to this arrangement, similar to the third embodiment, the flange segment 31D can be made from a high hardness material. Further, since three balls 16 are employed, friction force can be distributed into three balls to further reduce frictional wearing.

Moreover, three balls 16 uniformly urge the flange segment 31D for generating friction force and the flange segment 31D is rotatably supported through the bearing 31E. As a result, concentricity between the rotation axis of the coil spring 31 and the flange segment 31D and the rotation axis of the driven rotor 12 can be maintained even if the flange segment 31D is urged by the balls 16. Consequently, abnormal vibration due to displacement of the rotation axes can be restrained thereby stabilizing the fastener driving operation.

Figure 23:
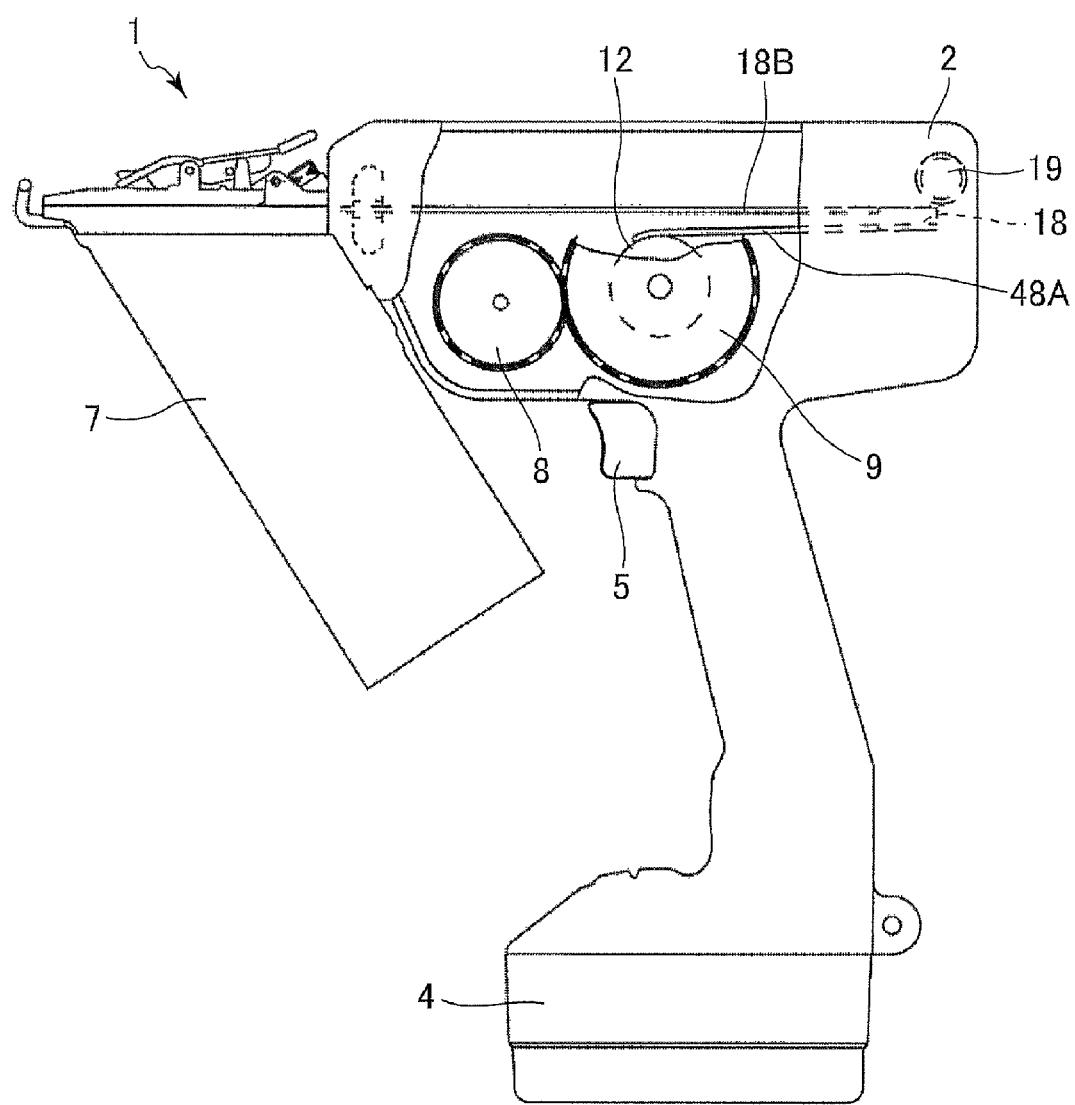
FIG. 23 is a side view partially cut away of an electrically powered fastener driver according to a fifth embodiment of the present invention.
Figure 24:
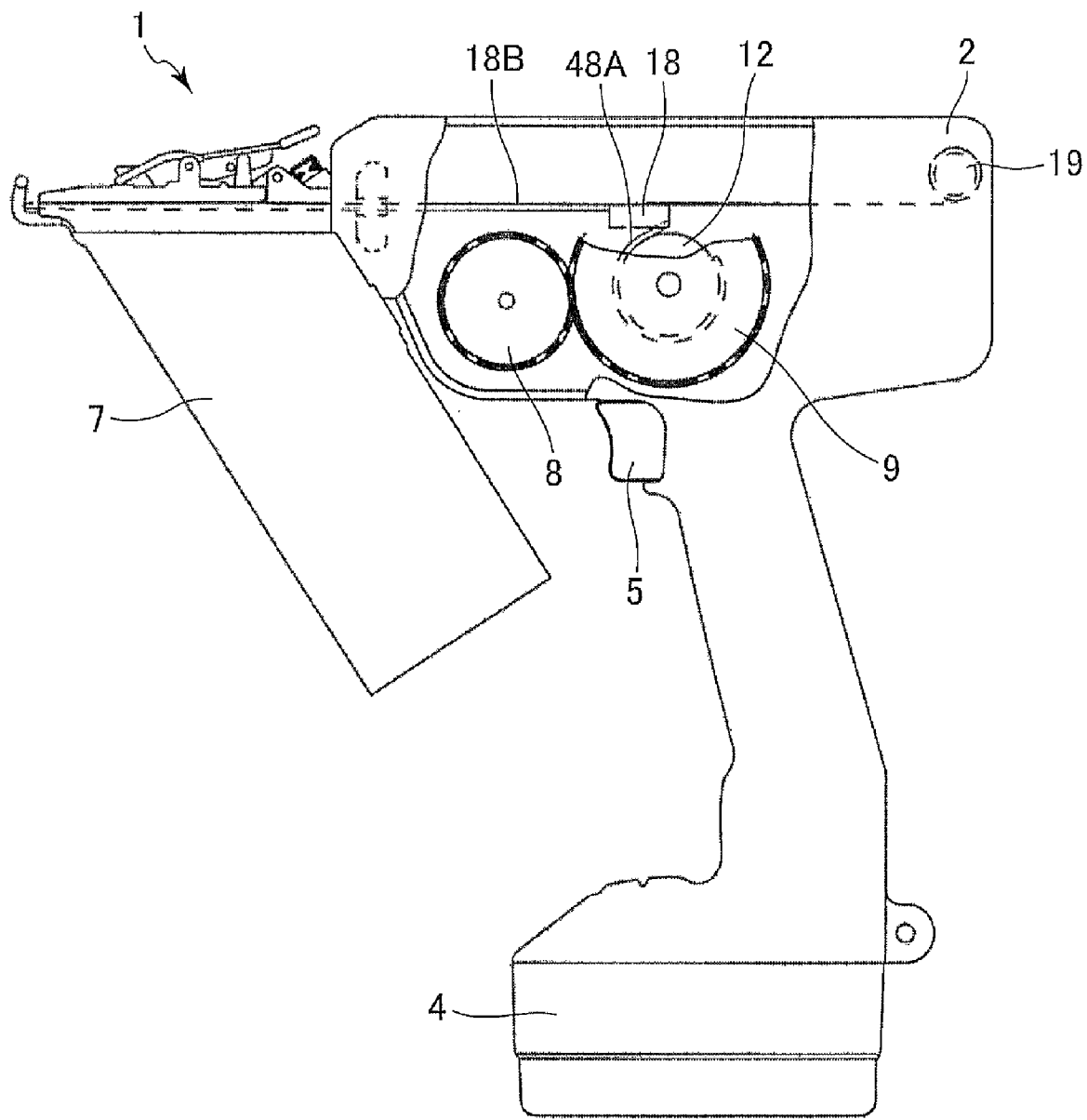
FIG. 24 is a side view partially cut away showing a terminal phase of a fastener driving operation in the electrically powered fastener driver according to the fifth embodiment.

A fastener driver according to a fifth embodiment of the present invention will be described with reference to FIGS. 23 and 24. The fifth embodiment employs a wire as shown in FIG. 23 instead of the rack 18A and pinion gear 12C those employed in the first through fourth embodiments. The wire 48A has one end fixedly connected to the rear portion of the driver segment 18 and another end attached to the outer peripheral surface of the driven rotor 12. Since the driven rotor 12 is drivingly connected to the flywheel 9, etc., the wire 48A is wound around the driven rotor 12 when the driven rotor 12 is rotated.

Upon winding the wire 48A, the driver segment 18 is shifted toward the front side of the housing 2 to drive the fastener. The wire 48A is light in weight in comparison with the weight of the pinion gear 12C and rack 18A. Thus, a light weight tool can result to enhance workability.

A fastener driver according to a sixth embodiment of the present invention will be described with reference to FIGS. 25 through 28. The sixth embodiment is similar to the fourth embodiment. Therefore, duplicating description will be neglected.

Figure 25:
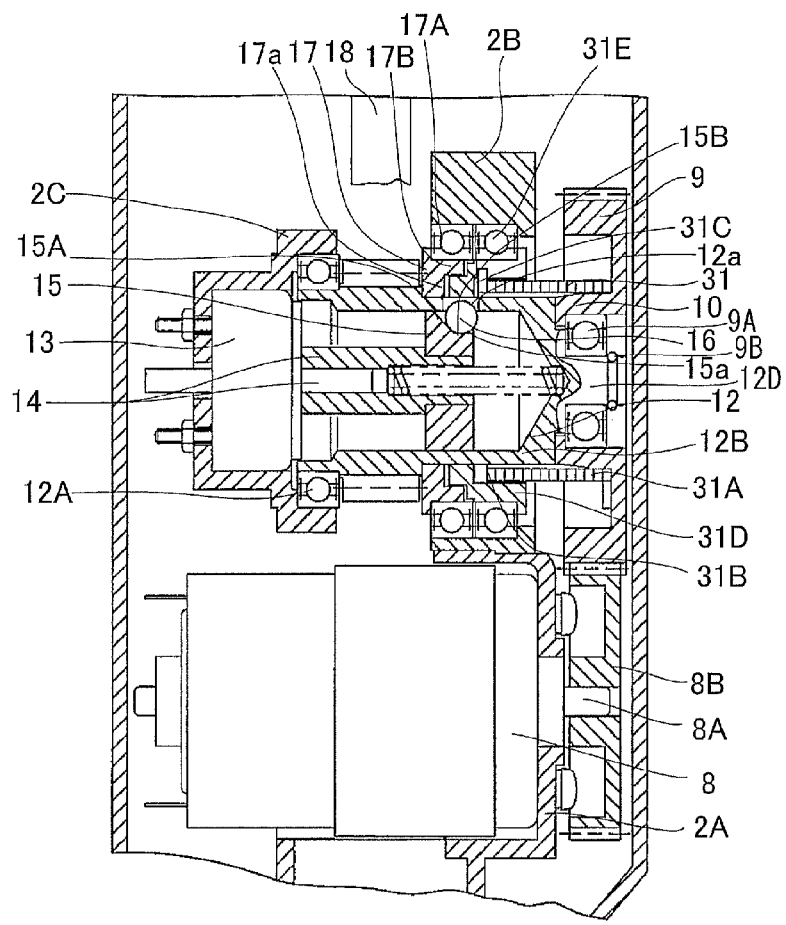
FIG. 25 is a cross-sectional view particularly showing an internal structure of an electrically powered fastener driver according to a sixth embodiment of the present invention.

As shown in FIG. 25, a driven rotor 12 is rotatably supported to a second wall 2B of a housing 2 through a bearing 17A. The driven rotor 12 is of a hollow cylindrical shape, and its axis is directed in parallel to a motor shaft 8A of a motor 8. The driven rotor 12 is also rotatably supported to a third wall 2C through a bearing 12A. Thus, the driven rotor 12 is supported at two locations, thereby being stably rotatable even upon abrupt application of a rotation force. Further, a generally annular support 17 is fitted with the driven rotor 12, so that the driven rotor 12 is rotatably supported to the bearing 17A through the annular support 17.

The driven rotor 12 has another end portion defining a spring seat portion 12B at a position in the vicinity of a drive shaft 10. Further, a support shaft 12D is provided at a distal end of the other end portion of the driven rotor 12 in a concentric relation thereto. A flywheel 9 is rotatably supported to the support shaft 12D through a bearing 9A.

Since the driven rotor 12 is supported rotatably with respect to the second wall 2B and third wall 2C of the housing 2, the flywheel 9 is not only rotatable with respect to the driven rotor 12, but also rotatably supported to the housing 2 through the bearings 9A and 12A. A snap ring 9B is attached to the end portion of the support shaft 12D in order to prevent the bearing 9A from being moved in the axial direction thereof.

Figure 26:
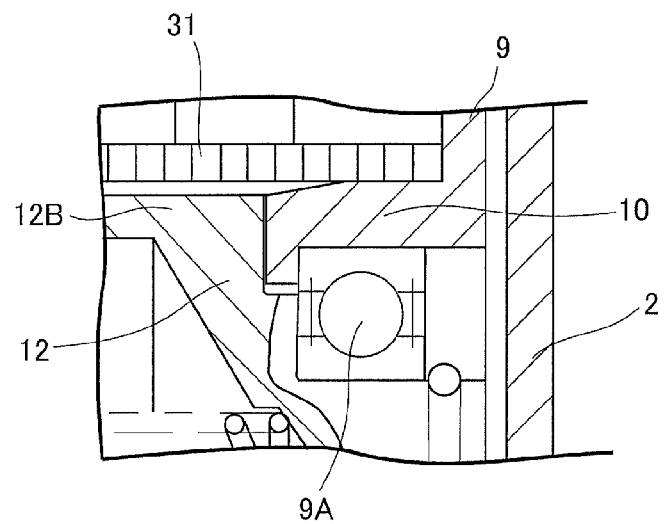
FIG. 26 is an enlarged cross-sectional view particularly showing a drive shaft and components associated thereto in the electrically powered fastener driver according to the sixth embodiment

The flywheel 9 has a radially inner section serving as a drive shaft portion 10 concentric with the driven rotor 12. As shown in FIG. 26, an outer diameter of the drive shaft portion 10 is gradually increased in a direction away from the driven rotor 12. That is, a maximum outer diameter of the drive shaft portion 10 (farthest from the driven rotor 12) is greater than an outer diameter of the spring seat portion 12B, while a minimum outer diameter of the drive shaft portion 10 (nearest to the driven rotor 12) is equal to the outer diameter of the spring seat portion 12B. Thus, the outer peripheral surface of the driven rotor 12 is generally continuous with the outer peripheral surface of the drive shaft portion 10 at a boundary therebetween.

A coil spring 31 is interposed between the drive shaft 10 and the driven rotor 12. The coil spring 31 has an inner diameter greater than the outer diameter of the spring seat portion 12B. The coil spring 31 has an end portion fixed to the drive shaft 10, and has another end portion disposed over the spring seat portion 12B.

Figure 27:
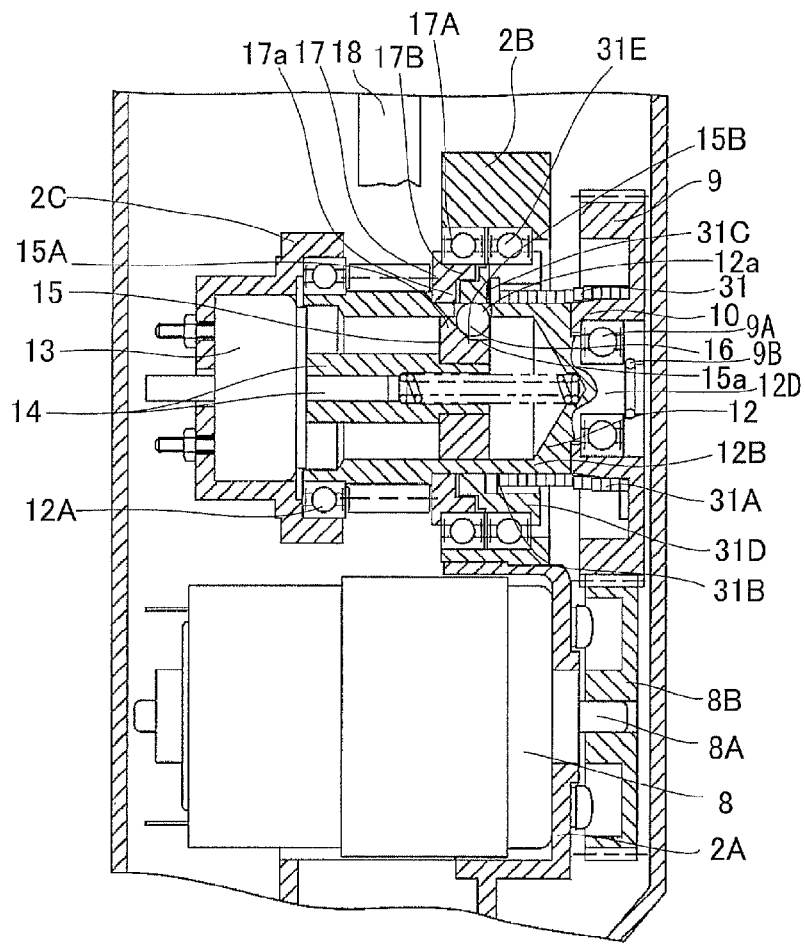
FIG. 27 is cross-sectional view showing a coupling state between a coil spring and a driven rotor in the electrically powered fastener driver according to the sixth embodiment.
Figure 28:
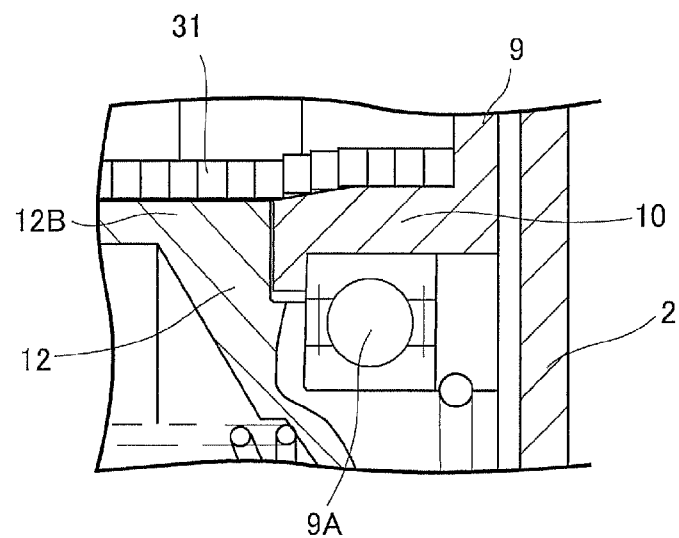
FIG. 28 is an enlarged cross-sectional view particularly showing the drive shaft and associated components in the coupling state between the coil spring and driven rotor in the electrically powered fastener driver according to the sixth embodiment.

For driving a fastener with the tool of the sixth embodiment, as shown in FIG. 27, upon cooperation of the solenoid 13 and the clutch mechanism including the urging section 15 and ball 16, the coil spring 31 is wound over the spring seat portion 12B so as to drivingly connect the drive shaft 10 to the driven rotor 12, whereupon rotation energy accumulated in the flywheel 9 will be transmitted to the drive segment 18. In this case, as shown in FIG. 28, since the neighboring outer diameters of the drive shaft 10 and the driven rotor 12 is equal to each other, an since the outer peripheral surface of the drive shaft 10 is continuous with the outer peripheral surface of the driven rotor 12, smooth winding of the coil spring 31 can result avoiding axial distortion thereof. Consequently, prolonged service life of the coil spring 31 can result.

While the invention has been described in detail and with reference to specific embodiments thereof, it would be apparent to those skilled in the art that various changes and modifications may be made therein without departing from the scope of the invention. For example, the coil spring used in the first through third embodiments is available in the fourth and sixth embodiments. Further, the drive shaft in the sixth embodiment is available in the first through fourth embodiments. Furthermore, in each embodiment, one end of the coil spring is fixed to the drive shaft whereas driving connection of the other end of the coil spring to the driven rotor is selectively performed. However, one end of the coil spring can be selectively coupled to the drive shaft and other end of the coil spring can be fixed to the driven rotor. In the latter case, the solenoid plunger and urging section should be provided at the drive shaft side to perform fastener driving operation in a manner similar to that of the foregoing embodiments.

INDUSTRIAL APPLICABILITY

The present invention is particularly available at an overhead location in a building site.

The invention claimed is:

1. An electric fastener driver comprising:
a housing having a fastener driving side;
a motor disposed in the housing;
a magazine attached to the housing for supplying a fastener to the fastener driving side;
a flywheel rotatably supported to the housing and driven by the motor;
a driven rotor rotatably supported to the housing;
a driver segment driven by the driven rotor and movable toward and away from the fastener driving side;
a coil spring that transmits a rotation force of the flywheel to the driven rotor; and
a clutch mechanism selectively coupling the flywheel to the driven rotor through the coil spring;
wherein the clutch mechanism is movable between a power transmission position at which the coil spring is coupled to the driven rotor and a power shut-off position at which the coil spring is separated from the driven rotor.

2. The electric fastener driver as claimed in claim 1, wherein the clutch mechanism comprises a solenoid that selectively urges the coil spring.

3. The electric fastener driver:
as claimed in claim 2, wherein the driven rotor is of a cylindrical shape providing an interior hollow space,
and the solenoid has a solenoid plunger disposed within the interior hollow space.

4. The electric fastener driver as claimed in claim 3, wherein the solenoid plunger is associated with the clutch mechanism for driving the clutch mechanism.

5. The electric fastener driver as claimed in claim 3, further comprising a coil spring that transmits a rotation force of the flywheel to the driven rotor; and
wherein the driven rotor is of a cylindrical shape and is formed with a through-hole extending in a radial direction thereof, and
wherein the clutch mechanism comprises a contact piece movable in the through-hole for urging the coil spring to couple the coil spring to the driven rotor.

6. The electric fastener driver as claimed in claim 1, wherein the coil spring has one end portion concentrically fixed to the flywheel, and another end portion disposed over the driven rotor having an outer diameter, the another end portion providing an inner diameter greater than the outer diameter of the driven rotor when the clutch mechanism is at the power shut-off position.

7. The electric fastener driver as claimed in claim 6, wherein the driven rotor is of a cylindrical shape providing an internal hollow space, and is formed with a through-hole extending in a radial direction thereof at a position in alignment with the another end portion, and the clutch mechanism further comprising a contact piece movable in the through-hole in the radial direction.

8. The electric fastener driver as claimed in claim 7, wherein the driven rotor has a spring seat section at a position in alignment with the through hole in the radial direction, the another end portion of the coil spring being nipped between the contact piece and the spring seat section when the clutch mechanism is at a power transmission position.

9. The electric fastener driver as claimed in claim 7, wherein the another end portion of the coil spring has a distal end portion extending in a direction to allow the contact piece to abut against the distal end portion when the clutch mechanism is at a power transmission position.

10. The electric fastener driver as claimed in claim 7, wherein the another end portion of the coil spring is connected to an annular flange segment, the through-hole having an open end in alignment with the annular flange segment for allowing the contact piece to be in direct contact with the annular flange segment.

11. The electric fastener driver as claimed in claim 10, wherein the driven rotor is formed with a plurality of through-holes extending in a radial direction thereof at a position in alignment with the another end portion and spaced away from each other at an equal interval in a circumferential direction of the driven rotor, and the clutch mechanism further comprising a plurality of contact pieces each movable in each through-hole in the radial direction.

12. The electric fastener driver as claimed in claim 7, wherein the clutch mechanism comprises a solenoid that selectively urges the coil spring, the solenoid comprising a solenoid plunger and an urging section driven by the solenoid plunger for urging the contact piece, at least a part of the solenoid plunger being disposed within the internal hollow space.

13. The electric fastener driver as claimed in claim 12, wherein the urging section is rotatable with respect to the solenoid plunger, and has a rotation axis coincident with a rotation axis of the flywheel.

14. The electric fastener driver as claimed in claim 1, wherein the driver segment has a fastener driving end and an opposite end, and the fastener driver further comprising a driver segment feed mechanism provided between the driven rotor and the driver segment for converting a rotary motion of the driven rotor into a linear motion of the driver segment in a direction from the opposite end to the fastener driving end, the feed mechanism comprising a rack provided at the driver segment and a pinion gear provided at the driven rotor and meshingly engaged with the rack.

15. The electric fastener driver as claimed in claim 1, wherein the driver segment has a fastener driving end and an opposite end, and the fastener driver further comprising a driver segment feed mechanism provided between the driven rotor and the driver segment for converting a rotary motion of the driven rotor into a linear motion of the driver segment in a direction from the opposite end to the fastener driving end, the feed mechanism comprising a wire having one end fixed to the opposite end, and another end fixed to the driven rotor.

16. An electric fastener driver comprising:

a housing having a fastener driving side;
   a motor disposed in the housing;
   a magazine attached to the housing for supplying a fastener to the fastener driving side;
   a flywheel rotatably supported to the housing and driven by the motor;
   a drive shaft provided at the flywheel and having an outer peripheral surface;
   a driven rotor rotatably supported to the housing and axially arrayed with and coaxial with the drive shaft, the driven rotor having an outer peripheral surface;
   a driver segment driven by the driven rotor;
   a coil spring that transmits a rotation force of the drive shaft to the driven rotor; and
   a clutch mechanism selectively coupling the drive shaft to the driven rotor through the coil spring for selectively rotating the driven rotor, the drive shaft providing an outer diameter at a side of the driven rotor equal to an outer diameter of the driven rotor at a side of the drive shaft, and the outer peripheral surface of the drive shaft being continuous with the outer peripheral surface of the driven shaft.

* * * * *